United States Patent
Engelhardt et al.

(10) Patent No.: US 6,664,537 B2
(45) Date of Patent: Dec. 16, 2003

(54) SCANNING MICROSCOPE, OPTICAL ARRANGEMENT AND METHOD FOR IMAGING IN SCANNING MICROSCOPY

(75) Inventors: Johann Engelhardt, Bad Schoenborn (DE); Juergen Hoffmann, Wiesbaden (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 107 days.

(21) Appl. No.: 09/921,313

(22) Filed: Aug. 3, 2001

(65) Prior Publication Data

US 2002/0024007 A1 Feb. 28, 2002

(30) Foreign Application Priority Data

Aug. 3, 2000 (DE) .......................... 100 38 622

(51) Int. Cl.$^7$ ................................ H01J 3/14
(52) U.S. Cl. ........................ 250/234; 250/216
(58) Field of Search ................... 250/234, 235, 250/236, 216, 214 C, 214 DC; 359/196, 198–199, 201–204, 224, 368, 385, 389

(56) References Cited

U.S. PATENT DOCUMENTS

| | | | |
|---|---|---|---|
| 4,893,008 A | | 1/1990 | Horikawa ............... 250/234 |
| 5,587,832 A | * | 12/1996 | Krause .................. 359/385 |
| 5,629,790 A | * | 5/1997 | Neukermans et al. ..... 359/198 |
| 6,088,145 A | * | 7/2000 | Dickensheets et al. .... 359/196 |

FOREIGN PATENT DOCUMENTS

| | | |
|---|---|---|
| DE | 99/36825 | 7/1999 |
| WO | 99/36825 | 7/1999 |

OTHER PUBLICATIONS

Ray S. Huang et al., "Laser beam profile deformation effect during Bragg acousto–optic interaction: a non–paraxial approximation",, Optical Engineering, dtd. Jul. 1999 vol. 38, No. 7 pgs 1122–1126.
"Beam Deflectors", OLE Nov. 1999 (5 pages).

* cited by examiner

Primary Examiner—Kevin Pyo
Assistant Examiner—Seung C. Sohn
(74) Attorney, Agent, or Firm—Foley & Lardner

(57) ABSTRACT

A scanning microscope, in particular a confocal scanning microscope, with a light source (1), preferably a laser, for generating an illumination light beam (14) for a sample (11) and a scanning device for deflecting the illumination light beam (14) is, with a view to fast and reliable image-data acquisition and a compact structure, configured and refined in such a way that the scanning device has at least one micromirror (16). An optical arrangement with a light source (1), preferably a laser, for generating a light beam and at least one micromirror (16) for deflecting the light beam is furthermore provided, in which an adaptive lens (22) is provided for correcting for mirror defects or deformation of the mirror surface. Lastly, a method for imaging in scanning microscopy, in particular in confocal scanning microscopy, with a light source (1), preferably a laser, for generating an illumination light beam (14) for a sample (11) and a scanning device for deflecting the illumination light beam (14) is provided, in which at least one micromirror (16) is used in the scope of the scanning device.

14 Claims, 3 Drawing Sheets

(PRIOR ART)

SCANNING MICROSCOPE, OPTICAL ARRANGEMENT AND METHOD FOR IMAGING IN SCANNING MICROSCOPY

CROSS REFERENCE TO RELATED APPLICATIONS

The invention claims priority of the German patent application 100 38 622.9 which is incorporated by reference herein.

FIELD OF THE INVENTION

The invention relates to a scanning microscope. In particular the invention relates to a confocal scanning microscope.

The invention furthermore relates to an optical arrangement. Lastly, the invention relates to a method for imaging in scanning microscopy.

BACKGROUND OF THE INVENTION

In scanning microscopy, a sample is illuminated with a light beam in order to observe the reflected or fluorescent light emitted by the sample. The focus of the light beam is generally moved in a sample plane by tilting two mirrors, the deflection axes usually being mutually perpendicular so that one mirror deflects in the x direction and the other deflects in the y direction. The tilting of the mirrors is performed, for example, with the aid of galvanometer control elements, in which case both fast, resonant as well as slower and more accurate nonresonant galvanometers are employed. The power of the light coming from the sample is measured as a function of the position of the scanning beam. In scanning microscopy and, in particular, in confocal scanning microscopy, lasers are preferably used as light sources in order to generate the illumination light beam for the sample.

In the scope of the scanning device, acousto-optical deflectors are also used instead of galvanometers, as disclosed for example by U.S. Pat. No. 4,893,008, "Scanning optical microscope".

Especially in confocal scanning microscopy, a sample is frequently scanned in three dimensions by the focus of a light beam. A confocal scanning microscope generally comprises a light source, a focusing lens by which the light from the light source is focused onto a pinhole—the "excitation aperture", a beam splitter, a scanning device for beam control, a microscope lens, a detection aperture and the detectors for registering the detection or fluorescent light. The illumination light, or the illumination light beam, is usually input via a main beam splitter. The fluorescent or reflected light coming from the sample travels via the same scanning device, or the same scanning mirror, back to the main beam splitter, and passes through the latter in order to be subsequently focused onto the detection aperture, behind which the detectors, usually photomultipliers, are located. Detection light which does not originate directly from the focus region takes a different light path and does not pass through the detection aperture, so that point information is obtained which leads to a three-dimensional image by sequential scanning of the sample. A three-dimensional image is usually achieved through layer-by-layer imaging.

In the galvanometer technology normally used at present, because of the inertia of the moving mechanical components, the maximum achievable scan rates are limited to a few hundred Hz for nonresonant galvanometers and a few kHz for resonant galvanometers. The end result of this is that the measurement times for each sample are relatively long.

Furthermore, the galvanometers generally have a length of several centimeters, the usually round mirrors having a diameter of about one centimeter. For beam deflection about two axes, at least two galvanometer mirrors in succession or cardanically interleaved are necessary. This galvanometer structure takes up a great deal of space in the microscope.

Although acousto-optical deflectors are faster than galvanometers, they nevertheless have the disadvantage that the beam quality is significantly deteriorated on passing through these elements. The circumstances responsible for this are described, for example, in "laser beam profile deformation effect during Bragg acousto-optic interaction: a non paraxial approximation", Huang et al., Optical Engineering, July 1999, Vol. 38, No. 7, ISSN 0091-3286.

SUMMARY OF THE INVENTION

It is therefore an object of the present invention to provide a scanning microscope with fast and reliable image-data acquisition and a compact structure.

According to the invention, the above object is achieved by a scanning microscope comprising: a light source for generating an illumination light beam, a scanning device for deflecting the illumination light beam across a sample, wherein the scanning device has at least one micromirror which is moveable in at least two directions, a cardan suspension or joint is provided to at least one micromirror and means for preferably simultaneous detection of the setting or position of at least one micromirror.

It is a further object of the invention to provide a confocal scanning microscope with fast and reliable image-data acquisition and a compact structure, produced with simply designed means.

The above object is achieved by a confocal scanning microscope, comprising a laser defining a light source for generating an illumination light beam, a scanning device for deflecting the illumination light beam across a sample, wherein the scanning device has at least one micromirror which is moveable in at least two directions, means for preferably simultaneous detection of the setting or position of at least one micromirror, and an adaptive lens for correcting micromirror defects or deformation of the micromirror surface.

It is a further object of the invention to provide an optical arrangement which provides fast and reliable image-data acquisition.

The above object is accomplished by an ptical arrangement comprising: a light source, for generating a illumination light beam, at least one micromirror for deflecting the illumination light beam, and an adaptive lens for correcting mirror defects or deformations of the mirror surface.

An additional object of the invention is to provides method for fast and reliable image-data acquisition.

The above object is accomplished by a method for imaging in scanning microscopy, comprising the steps of:
providing an illumination light beam with a laser,
using at least one micromirror for deflecting the illumination light beam and
deflecting the illumination light beam across a sample and thereby defining an actual scan path on the sample.

Through the use of a micromirror, the scanning rate can be significantly increased. A micromirror or a microelectrical scanner, as disclosed for example by PCT/US 99/00564 or by the journal OLE, November 1999, achieves very high deflection rates because of the low mass of the moving parts. The micromirrors are usually operated electrically at their resonant frequency. This is typically in the region of 20 kHz.

The micromirrors are often fabricated "from bulk" by lithographic methods, as are also employed in semiconductor technology, in such a way that only thin torsionable linking sections then carry the actual mirror.

A micromirror furthermore requires a significantly smaller assembly space. This greatly contributes to a compact scanning microscope structure.

Consequently, the scanning microscope according to the invention provides a scanning microscope in which fast and reliable image-data acquisition and a compact structure are produced with simply designed means.

With a view to reliable scanning of a specific sample area, at least one micromirror could be movable in at least two directions. At least one micromirror could then have a cardan suspension or joint. In the case of such a configuration of the micromirror, movable in at least two directions, no other mirror is needed for scanning the sample. This contributes to the compactness of the overall arrangement, a micromirror usually extending only over a few millimeters. Mirror areas of 3 mm×3 mm are typical.

To guarantee a high image quality, a scan point could be assignable to each detection signal. In this case, in particular, means could be provided for preferably simultaneous detection of the setting or position of at least one micromirror. This makes it simple to assign a detection signal to a scan point.

Specifically, the means could be designed for capacitive and/or inductive detection. This permits contactless detection.

As an alternative or in addition to this, the means could have a device for generating a reference light beam. Such a reference light beam could be reflected by the back of the mirror.

For processing the reference light beam, a sensor could be provided for the reference light beam. Particularly simply, the sensor could have a CCD array. In other words, a reference light beam could be reflected by the back of the mirror onto a CCD array, so that the mirror setting or mirror position can be ascertained.

A resonantly operating micromirror, however, does not allow deliberate movement of the illumination light beam onto a specific scan point. It is simply not possible to hold, or "park", the sampling light beam, or illumination light beam, on a scan point of the sample. A "piggyback arrangement" could be used to solve this problem, with at least one micromirror being arranged on a deflection element which can be adjusted in a defined way. Such a deflection element could be movable significantly more slowly than the micromirror. Specifically, the deflection element could particularly simply be a nonresonant galvanometer. This makes it possible, on the one hand, to approach a defined scan point deliberately and, on the other hand, to hold the sampling light beam on a scan point of the sample.

In an ideal scanning microscope, the path of the scanned illumination light beam would need to describe a meander on the sample surface or—in a confocal arrangement—in a layer plane in the sample. Such a meander could be generated by firstly scanning a line in the X direction with a constant Y position. It would then be necessary to stop the X scan and swing by Y adjustment to the next line to be scanned, whereupon this line would need to be read in the negative X direction with a constant Y position. The X scan would subsequently have to be stopped again, and travel in the Y direction to the next line would need to take place. In reality, because of the inertia of the moving galvanometer components and of the mirrors, such a meander can only be achieved approximately for low scan rates. In fact, at scan rates in excess of 100 Hz, the scan path of the light beam describes a quasi-sinusoidal curve. For correcting or compensating for deviations of the actual scan path from the target scan path of the illumination light beam, electronics or a PC could be provided when assigning the detection signals to the scan point locations. It could then even be possible to redress a deviation from the sine shape, which likewise frequently occurs.

The situation may also arise that the curve shape for the deflection in the positive X direction deviates from the curve shape in the opposite negative X direction. Correction could also be applied to such defects, in which case electronics or a PC could likewise be used.

Furthermore, account could be taken of the fact that intensity and position signals can have different electronic propagation and processing times. Here again, electronics or a PC could be provided for correcting or compensating for different electronic propagation and/or processing times of a detection and position signal.

Furthermore, account could be taken of the fact that, because of their inertia, the control elements react late to their drive signal. Here again, electronics or a PC could be provided for correcting or compensating for the drive inertia of control elements.

Furthermore, the path velocity in the vicinity of the turnaround points is less than in the linear sine range, which leads inter alia to increased bleaching in these regions. To eliminate these effects, means could be provided for interrupting the illumination light beam—in particular during transit through the turnaround subsections of the scan path.

The abovementioned electronics or PCs, as well as the means for interrupting the illumination light beam, could also be provided in a scanning microscope which has a conventional scanning device with conventional mirrors, or another rapidly deflecting scanning device that provides fast deflection using an element other than a micromirror.

With a view to uniform illumination of the sample to be examined, a device could be provided which matches the instantaneous illumination optical power to the scanning rate in such a way that the quantity of energy deposited per unit time in a scan volume is constant. It could thereby be possible to redress changes in the deflection rate of the illumination beam during the scanning of the sample.

Specifically, the device could have at least one controllable and/or regulatable attenuator arranged in the illumination beam path. Particularly simply, at least one attenuator could have an acousto-optical filter.

In principle, the dwell time of the illumination light beam at each scan point when scanning a sample with a fast deflector, or a fast scanning device, is shorter than when scanning with slower deflectors, or slower scanning devices. Consequently, with an equal illumination optical power, less light falls on the individual scan points. Since it is not possible to deviate from the resonant frequency of the micromirror, the illumination optical power at the higher scanning rate could be correspondingly increased when scanning the sample, in order to provide a sufficient amount of light per scan point. As an alternative to this, the scan points could be multiply scannable and the respective detection signals could be accumulatable. At least one image line could then be multiply scannable in succession, preferably bidirectionally, and the respective detection signals could be accumulatable.

Even the latter features—for example a device which matches the instantaneous illumination optical power to the scanning rate in such a way that the quantity of energy deposited per unit time in a scan volume is constant, the provision of an attenuator in the form of, for example, an acousto-optical filter, and also the possibility of multiply scanning the scan points or multiply scanning individual image lines—could in principle be implemented in all scanning devices, in particular fast scanning devices.

Both in the case of fast micromirrors and in the case of other fast deflectors, the disadvantage is encountered that the beam quality becomes deteriorated. In the case of micromirrors, this is essentially attributable to the lack of mechanical stiffness of the thin material. In particular with high deflection frequencies and large deflection angles, the front of the mirror does not stay flat, which leads to deformations of the phase front of the deflected light beam.

In principle, the scanning or illumination light beam radius should be less than the dimensions of the deflecting mirrors, since optical power losses and interfering diffraction phenomena at the mirror edges would otherwise occur. Since the micromirrors have a small overall shape, which ties in with a compact configuration of the scanning microscope, the radii of the light beams must likewise be correspondingly small. In order to be able to illuminate the objective pupil fully in spite of this, without also having to tolerate any restriction of the scan-field dimensions, the maximum deflection angle needs to the increased in accordance with the cross-sectional reduction of the beam. This exacerbates the deformation of the mirror surface, and hence contributes to the deterioration of the transverse beam quality.

An adaptive lens could be provided for correcting mirror defects or deformation of the mirror surface. To that end, the adaptive lens could have an active optical element, in particular for correcting phase-front defects, which could be arranged in the beam path of the scanning microscope.

Specifically, the adaptive lens could have a mirror which can be deformed by preferably electrostatic actuators. Mirrors of this type are known and are commercially available.

In particular, the adaptive lens could have an element by which phase lags can be deliberately imposed on individual parts of the illumination and/or the detection light beam. Such an element could simply be an LCD scan element.

The element could, particularly effectively, be arranged in a Fourier plane which is conjugate with the deflection plane and lies in the beam path.

The element could be actively controllable and/or regulatable with a view to uniform or optimum transverse field distribution of the light beams. To that end, a device could be provided for detecting the current transverse field distribution. Processing logic, by which a suitable control signal can be generated, could interact with the device.

To avoid repetition with regard to the detailed description of the adaptive lens, reference is made to the preceding sections which describe the advantages and the configuration of an adaptive lens, together with a device for detecting the current transverse field distribution and processing logic which interacts with the device.

For correcting or compensating for deviations of the actual scan path from the target scan path of the illumination light beam when assigning the detection signals to the scan point locations, electronics or a PC could be used. For correcting or compensating for different electronic propagation and/or processing times of a detection and position signal, electronics or a PC could likewise be used. Lastly, for correcting or compensating for the drive inertia of control elements, electronics or a PC could likewise be used.

Furthermore, means could be used for interrupting the illumination light beam—in particular during transit through the turnaround subsections of the scan path.

Furthermore, a device could be used which matches the instantaneous illumination optical power to the scanning rate in such a way that the quantity of energy deposited per unit time in a scan volume is constant. The device could have at least one controllable and/or regulatable attenuator arranged in the illumination beam path. At least one attenuator could have an acousto-optical filter.

Furthermore, scan points could be multiply scanned and the respective detection signals could be accumulated. As an alternative or in addition to this, at least one image line could be multiply scanned in succession, preferably bidirectionally, and the respective detection signals could be accumulated.

For correcting mirror defects or deformation of the mirror surface, an adaptive lens could be used, which could have an active optical element, in particular for correcting phase-front defects. Specifically, the adaptive lens could have a mirror which can be deformed by preferably electrostatic actuators. The adaptive lens could have an element by which phase lags can be deliberately imposed on individual parts of the illumination and/or the detection light beam. The element could be an LCD scan element. Furthermore, the element could be arranged in a Fourier plane which is conjugate with the deflection plane and lies in the beam path.

In a preferred embodiment, the element could be actively controllable and/or regulatable with a view to uniform transverse field distribution of the light beams. To that end, a device could be used for detecting the current transverse field distribution, and processing logic could be used, which interacts with the device and by which a suitable control signal can be generated.

With regard to a detailed description of the advantages of the features of the method for imaging in scanning microscopy, to avoid repetition, reference is made to the corresponding description of the features in the scope of the explanation of the claimed scanning microscope.

BRIEF DESCRIPTION OF THE DRAWINGS

There are, moreover, various possible ways of advantageously configuring and developing the teaching of the present invention. Generally preferred configurations and developments of the teaching are furthermore explained in connection with the explanation of the preferred exemplary embodiments of the invention with the aid of the drawing. In the drawing.

DETAILED DESCRIPTION OF THE INVENTION

Figure 1:
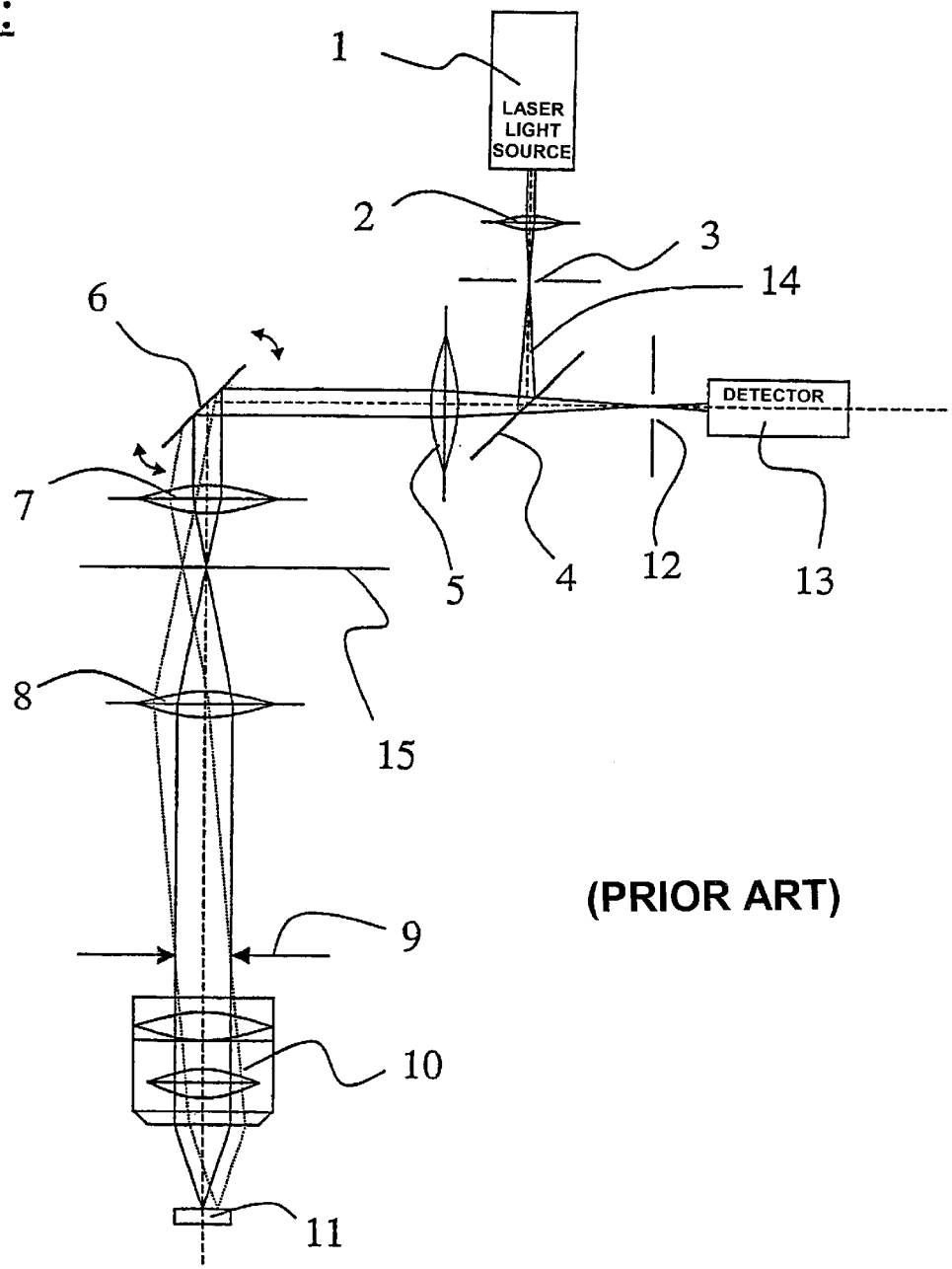
FIG. 1 shows a conventional scanning microscope in a schematic representation.

FIG. 1 shows, in a schematic representation, a conventional confocal scanning microscope with a light source 1 in the form of a laser for generating an illumination light beam 14 for a sample 11. A lens 2, by which the light from the light source 1 is focused onto an illumination aperture 3, is arranged in the beam path after the light source 1. After the illumination aperture 3, the illumination light beam 14 travels to a beam splitter 4 which reflects the illumination light beam 14 through a lens 5 onto a scan mirror 6.

Lenses 7 and 8, after which the pupil 9 of the objective 10 is formed, are arranged after the scan mirror 6. The illumination light beam 14 then travels through the objective 10 onto the sample 11.

To register the detection or fluorescent light, a detector 13 arranged after a detection aperture 12 is used. The intermediate image plane 15 is formed between the lenses 7 and 8.

Figure 2:
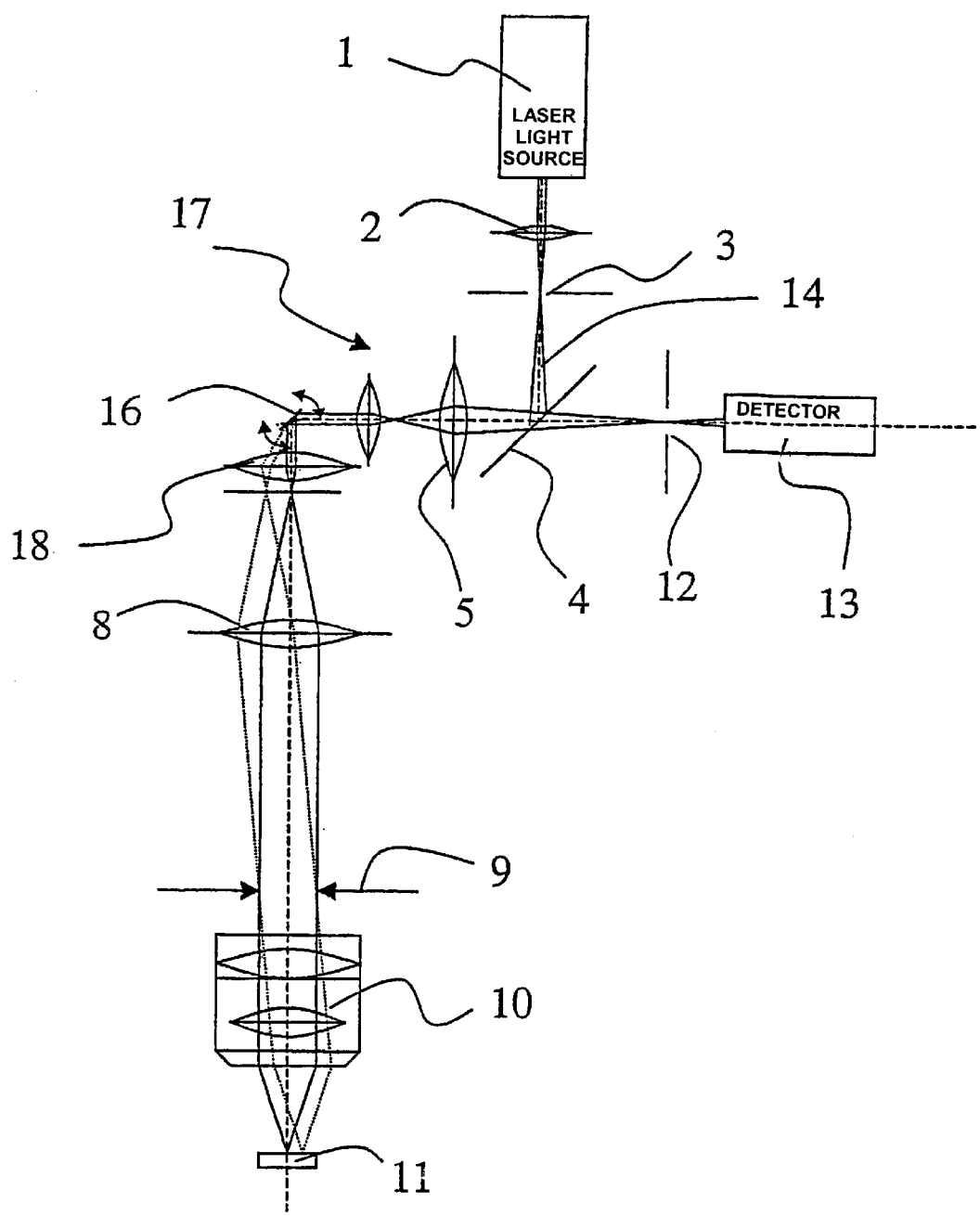
FIG. 2 shows the first exemplary embodiment of a scanning microscope according to the invention in a schematic representation.

With a view to fast and reliable image-data acquisition and a compact structure, the scanning device of the first exemplary embodiment of the scanning microscope according to the invention, shown in FIG. 2, is provided in the form of a micromirror 16. The components shown in FIG. 2, which correspond to the respective components of the conventional scanning microscope shown in FIG. 1, are denoted by the same reference numbers. Reference will be made to the description of FIG. 1 for their explanation.

In front of and behind the micromirror 16, a respective lens 17 and 18 is in each case arranged. The scanning microscope according to the invention, shown in FIG. 2, is very compactly configured.

Figure 3:
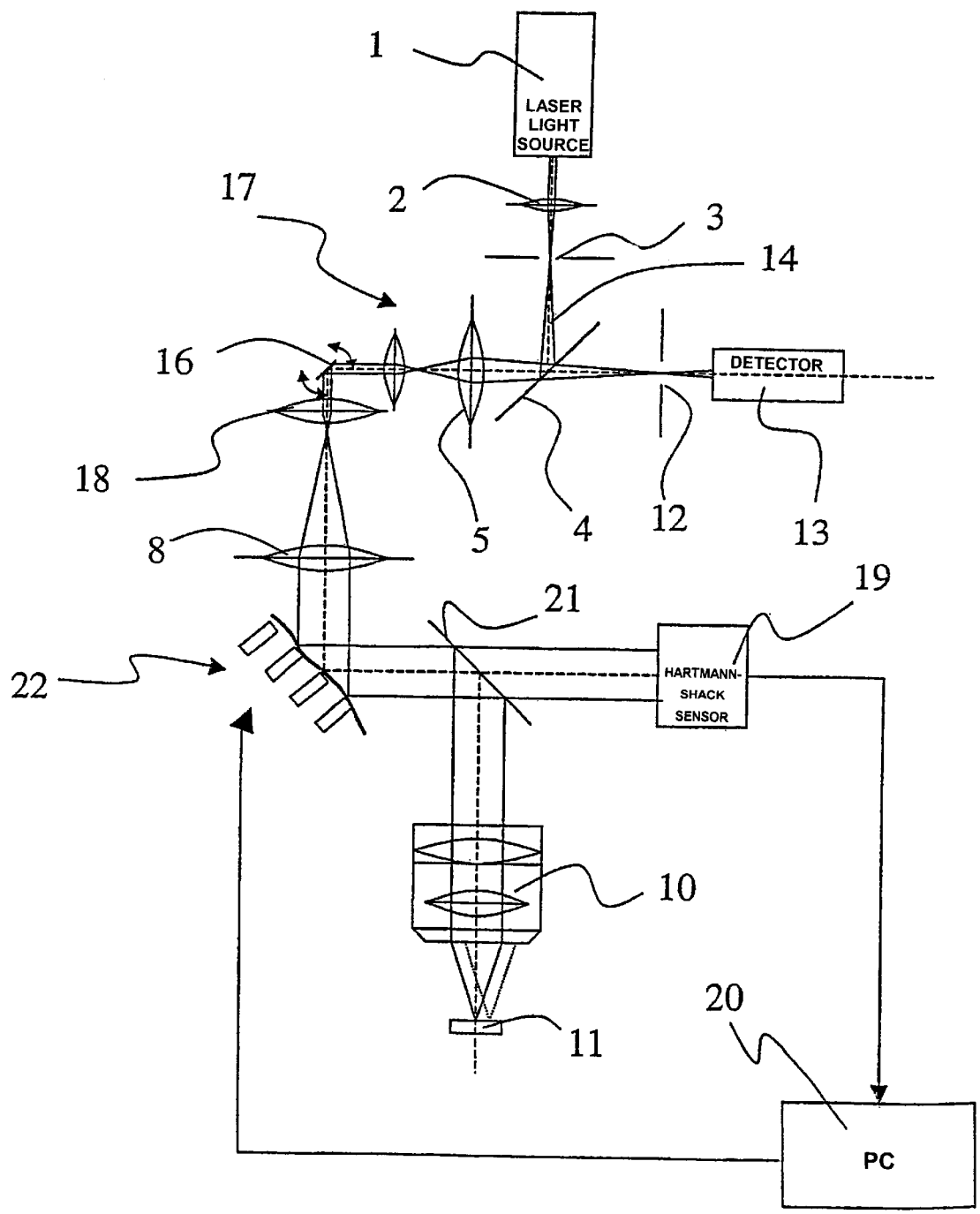
FIG. 3 shows the second exemplary embodiment of a scanning microscope according to the invention in a schematic representation.

FIG. 3 shows, in a schematic representation, the second exemplary embodiment of a scanning microscope according to the invention. Here again, components which have already been described in the previous FIG. 1 and 2, and which correspond to the components described there, are denoted by the same reference numbers. In the exemplary embodiment shown in FIG. 3, an adaptive lens 22 is provided in the form of a piezo mirror. The piezo mirror is controlled by a PC or computer 20. The control signal needed for this is ascertained with the aid of a Hartmann-Shack sensor, which forms a device 19 for detecting the current transverse field distribution. For correcting the aberrations, the PC 20 calculates the respective Zernike polynomials.

Between the adaptive lens 22 and the Hartmann-Shack detector 19, a mirror 21 is arranged which, on the one hand, reflects the illumination light beam onto the sample 11 and, on the other hand, transmits light to the Hartmann-Shack detector 19.

With regard to other advantageous refinements and developments of the teaching according to the invention, reference is made, on the one hand, to the general part of the description and, on the other hand, to the appended patent claims.

To conclude, it should more particularly be emphasized that the exemplary embodiments selected purely arbitrarily above are merely used to describe the teaching according to the invention, but do not restrict it to these exemplary embodiments.

What is claimed is:

1. A confocal scanning microscope, comprising:
   a laser for generating an illumination light beam,
   a scanning device for deflecting the illumination light beam across a sample, wherein the scanning device has at least one micromirror which is moveable in at least two directions, and wherein a cardan suspension or joint is provided to the at least one micromirror,
   a detector to simultaneously detect the setting or position of the at least one micromirror, and
   an adaptive optical system for correcting micromirror defects or deformation of the micromirror surface and wherein the adaptive optical system is associated with a sensor.

2. The confocal scanning microscope as defined in claim 1, wherein the detector is designed for capacitive or inductive detection.

3. The confocal scanning microscope as defined in claim 1 wherein a mirror for generating a reference light beam is provided and wherein the a sensor is positioned in the reference light beam.

4. The confocal scanning microscope as defined in claim 1, wherein the deflected illumination light beam defines an actual scan path and electronics or a PC are provided for correcting or compensating for deviations of the actual scan path from a target scan path of the illumination light beam when assigning each detection signal to a respective scan point location.

5. The confocal scanning microscope as defined in claim 1, wherein a means for interrupting the illumination light beam is provided.

6. The confocal scanning microscope as defined in claim 1, wherein the adaptive optical system comprises an adaptive lens for correcting micromirror defects or deformation of the micromirror surface.

7. The confocal scanning microscope as defined in claim 6, wherein the adaptive lens has an active optical element, in particular for correcting phase-front defects.

8. A confocal scanning microscope, comprising a laser defining a light source for generating an illumination light beam, a scanning device for deflecting the illumination light beam across a sample, wherein the scanning device has at least one micromirror which is moveable in at least two directions, means for simultaneous detection of the setting or position of the at least one micromirror, and an adaptive lens for correcting micromirror defects or deformation of the micromirror surface, wherein the adaptive lens is associated with a sensor.

9. The confocal scanning microscope as defined in claim 8, wherein the adaptive lens has a mirror which is deformable by preferably electrostatic actuators.

10. The confocal scanning microscope as defined in claim 8, wherein the adaptive lens is actively controllable to uniform transverse field distribution of the illumination or the detection light beam.

11. A method for imaging in confocal scanning microscopy, comprising the steps of:
   providing an illumination light beam with a laser,
   using at least one micromirror for deflecting the illumination light beam,
   deflecting the illumination light beam across a sample and thereby defining an actual scan path on the sample, and
   correcting or compensating for deviations of the actual scan path from a target scan path of the illumination light beam when assigning detection signals to scan point locations.

12. The method according to claim 11, wherein a plurality of scan points are arranged along a scan path wherein the scan points are multiply scanned and the respective detection signals are accumulated.

13. The method according to claim 11, wherein an adaptive lens is used for correcting mirror defects or deformation of the mirror surface of the micromirror.

14. The method according to claim 13, wherein the adaptive lens has an active optical element for correcting phase-front defects.

* * * * *